United States Patent
Yang et al.

(10) Patent No.: US 8,452,113 B2
(45) Date of Patent: May 28, 2013

(54) METHOD OF ENCODING AN IMAGE AND DEVICE IMPLEMENTING SAID METHOD

(75) Inventors: Libo Yang, Beijing (CN); Lihua Zhu, Beijing (CN); Xiaoan Lu, Princeton, NJ (US)

(73) Assignee: Thomson Licensing (FR)

( * ) Notice: Subject to any disclaimer, the term of this patent is extended or adjusted under 35 U.S.C. 154(b) by 731 days.

(21) Appl. No.: 12/448,119

(22) PCT Filed: Dec. 11, 2006

(86) PCT No.: PCT/CN2006/003359
§ 371 (c)(1),
(2), (4) Date: Jan. 29, 2010

(87) PCT Pub. No.: WO2008/071028
PCT Pub. Date: Jun. 19, 2008

(65) Prior Publication Data
US 2010/0135590 A1    Jun. 3, 2010

(51) Int. Cl.
*G06K 9/00* (2006.01)

(52) U.S. Cl.
USPC ........... 382/251; 382/250; 382/248; 382/245; 382/268; 382/239; 375/240.16; 375/240.02; 375/240.12; 375/240.25; 375/240.29

(58) Field of Classification Search
USPC ................. 382/239, 236, 251, 323, 245, 268, 382/233, 248, 252, 240, 250; 375/240.02, 375/240.12, 240.16, 240, 18, 240.23, 240.25, 375/240.29; 358/3.01, 3.03, 1.9, 1.1
See application file for complete search history.

(56) References Cited

U.S. PATENT DOCUMENTS

| | | | | |
|---|---|---|---|---|
| 5,654,759 A | * | 8/1997 | Augenbraun et al. | ... 375/240.03 |
| 5,737,451 A | * | 4/1998 | Gandhi et al. | ................. 382/268 |
| 5,796,435 A | * | 8/1998 | Nonomura et al. | ...... 375/240.03 |
| 5,930,398 A | * | 7/1999 | Watney | .......................... 382/239 |
| 5,970,172 A | * | 10/1999 | Mochizuki | .................... 382/233 |

(Continued)

FOREIGN PATENT DOCUMENTS

| | | |
|---|---|---|
| EP | 0843481 | 5/1998 |
| JP | 05260308 | 10/1993 |
| JP | 06165155 | 6/1994 |
| JP | 10164581 | 6/1998 |
| JP | 11-8851 | 1/1999 |
| JP | 2006005650 | 1/2006 |
| WO | WO9408427 | 4/1994 |

OTHER PUBLICATIONS

Search Report Dated September 10, 2007.

*Primary Examiner* — Mekone Bekele
(74) *Attorney, Agent, or Firm* — Jack Schwartz and Associates, PLLC

(57) ABSTRACT

The invention relates to a method of encoding an image divided into non-overlapping macroblocks themselves divided into non-overlapping blocks of N by N pixels into a binary stream. It comprises the steps of: —transforming each of the block into a transformed block of coefficients comprising one low frequency coefficient and N2-1 coefficients, called high frequency coefficients, of higher frequencies than the low frequency; —quantizing each coefficient of each of the transformed blocks with a quantizing parameter; —encoding the quantized coefficients into a binary stream. According to the invention, the low frequency coefficients of the transformed blocks are quantized with a same quantizing parameter, called first quantizing parameter.

11 Claims, 4 Drawing Sheets

U.S. PATENT DOCUMENTS

| | | |
|---|---|---|
| 6,167,087 A | 12/2000 | Kato |
| 6,205,174 B1* | 3/2001 | Fert et al. ................. 375/240.03 |
| 6,591,016 B2* | 7/2003 | Fert et al. ....................... 382/239 |
| 6,771,703 B1* | 8/2004 | Oguz et al. ............... 375/240.03 |
| 6,798,837 B1* | 9/2004 | Uenoyama et al. ...... 375/240.16 |
| 7,692,817 B2* | 4/2010 | Katohgi ....................... 358/3.03 |
| 2004/0042675 A1* | 3/2004 | Kobayashi .................... 382/245 |
| 2004/0213473 A1 | 10/2004 | Ohira |
| 2005/0286786 A1 | 12/2005 | Noda |
| 2005/0286791 A1* | 12/2005 | Katohgi ....................... 382/252 |

* cited by examiner

METHOD OF ENCODING AN IMAGE AND DEVICE IMPLEMENTING SAID METHOD

This application claims the benefit, under 35 U.S.C. §365 of International Application PCT/CN2006/003359, filed Dec. 11, 2006, which was published in accordance with PCT Article 21(2) on Jun. 19, 2008 in English.

1. FIELD OF THE INVENTION

The invention relates to a method of encoding an image. More precisely it concerns a method of quantizing said image. The invention also relates to an encoding device implementing said method.

2. BACKGROUND OF THE INVENTION

In order to encode an image, it is often necessary to reduce spatial redundancies. To this aim, in typical image coding methods, the image is divided into non-overlapping blocks of N×N pixels and each block is then transformed into a transformed block of coefficients. These coding methods decorrelate the image pixels so that the redundancy can be reduced more efficiently in the transform domain. In this respect, the energy compaction property of the transform is important. Among the various transforms commonly used, the Discrete Cosine Transform (DCT) is widely used for its superior energy compaction property. The transformed block represents a set of coefficients with increasing spatial frequencies. The coefficient in the top left (0,0) position of the transformed block is known as the DC coefficient, and it represents the average value of the N×N block. The other ($N^2$-1) coefficients are known as AC coefficients, and they represent the high-frequency details. The dimension N×N can be 16×16, 8×8 or 4×4 according to different applications. In order to reduce the number of bits required to encode the image, typical image coding methods quantize the coefficients of the transformed blocks with a quantizing step. Quantization is the process of reducing the number of possible values of a quantity, thereby reducing the number of bits needed to represent it. The choice of the quantizing step is decisive to insure a high quality of the decoded image.

3. SUMMARY OF THE INVENTION

The invention aims at providing a solution for the quantization of an image.

To this aim, the invention relates to a method of encoding an image divided into non-overlapping macroblocks themselves divided into non-overlapping blocks of N by N pixels into a binary stream. It comprises the steps of:

transforming each of the block into a transformed block of coefficients comprising one low frequency coefficient and $N^2$-1 coefficients, called high frequency coefficients, of higher frequencies than the low frequency;

quantizing each coefficient of each of the transformed blocks with a quantizing parameter;

encoding the quantized coefficients into a binary stream.
According to the invention, the low frequency coefficients of the transformed blocks are quantized with a same quantizing parameter, called first quantizing parameter. This advantageously makes it possible to ensure a continuous basic quality on the whole image Advantageously, the high frequency coefficients of a same macroblock are quantized with a same quantizing parameter, called second quantizing parameter.

Preferentially, the second quantizing parameter is computed as the sum of the first quantizing parameter and of an increment, the increment being determined based on a visual perceptual interest value computed for the macroblock.

According to a first aspect of the invention, the visual perceptual interest value depends on the average luminance value of the macroblock.

According to a variant, the visual perceptual interest value also depends on the variance of each block of the macroblock.

According to another variant, the visual perceptual interest value also depends on the chrominance information of the macroblock.

The invention further relates to a device for encoding an image divided into non-overlapping macroblocks themselves divided into non-overlapping blocks of N by N pixels into a binary stream. This device comprises:

transform means for transforming each of the block into a transformed block of coefficients comprising one low frequency coefficient and $N^2$-1 coefficients, called high frequency coefficients, of higher frequencies than the low frequency;

quantizing means for quantizing each coefficient of each of the transformed blocks with a quantizing parameter;

encoding means for encoding the quantized coefficients into a binary stream.
According to the invention, the quantizing means quantize the low frequency coefficients of the transformed blocks with a same quantizing parameter, called first quantizing parameter.

According to an aspect of the invention the transform means are a DCT transform unit.

4. BRIEF DESCRIPTION OF THE DRAWINGS

Other features and advantages of the invention will appear with the following description of some of its embodiments, this description being made in connection with the drawings in which.

5. DETAILED DESCRIPTION OF PREFERRED EMBODIMENTS

In FIGS. 1 to 3 and FIG. 5, the represented boxes are purely functional entities, which do not necessarily correspond to physical separated entities. Namely, they could be developed in the form of software, or be implemented in one or several integrated circuits. On these figures, the similar elements are referenced with the same numbers.

The invention relates to a method of encoding an image. The image is made up of pixels and divided into non-overlapping macroblocks $M_l$ themselves divided into blocks $b_{p,q}$ of pixels, where l is the index of the macroblock and (p,q) are the coordinates of the block, i.e. the block $b_{p,q}$ is located in $p^{th}$ column of blocks and in CO line of blocks. In many applications, a block $b_{p,q}$ is a block of 8 pixels by 8 pixels and a macroblock is made up of 4 blocks $b_{p,q}$. However, the invention is not limited to this case and may be used whatever the size of the blocks $b_{p,q}$ and the size of the macroblocks $MB_l$ are.

Figure 1:
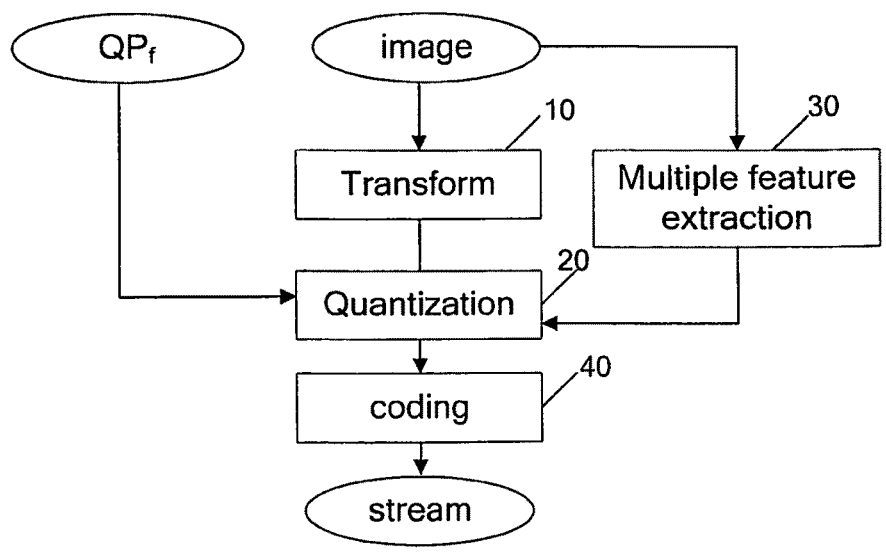
FIG. 1 depicts a flowchart of the method according to a first embodiment of the invention.
Figure 2:
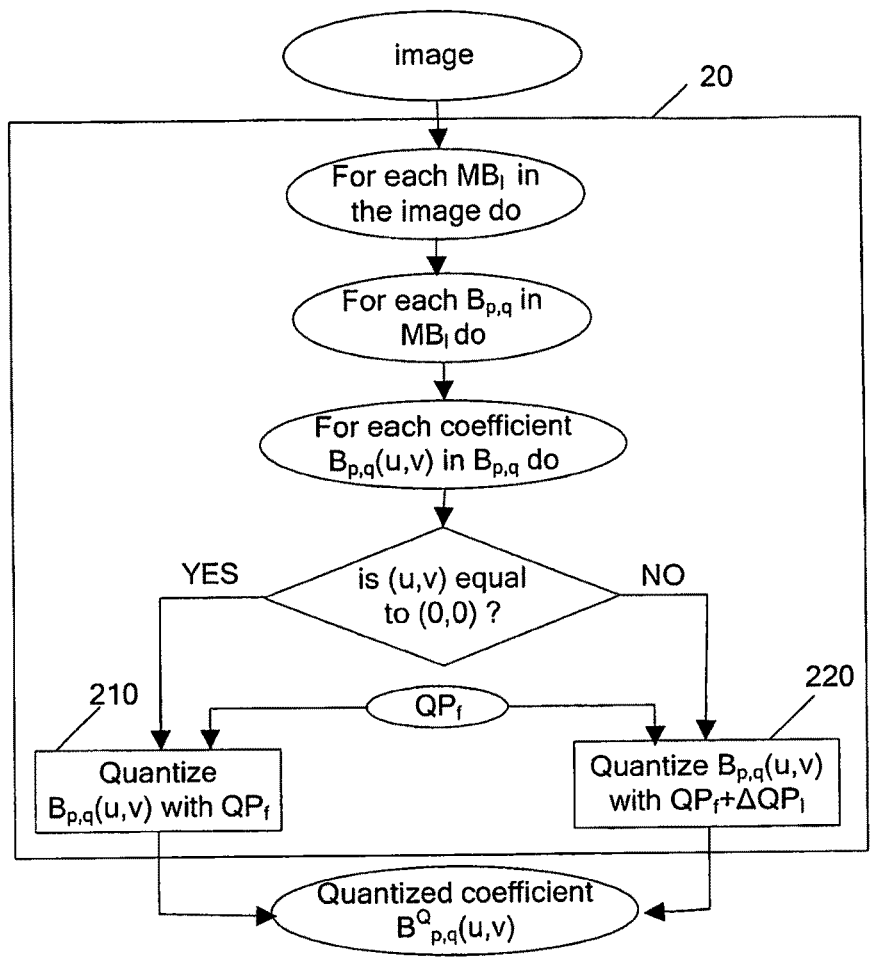
FIG. 2 depicts a detailed flowchart of the quantization step of the method according to a first embodiment of the invention.
Figure 3:
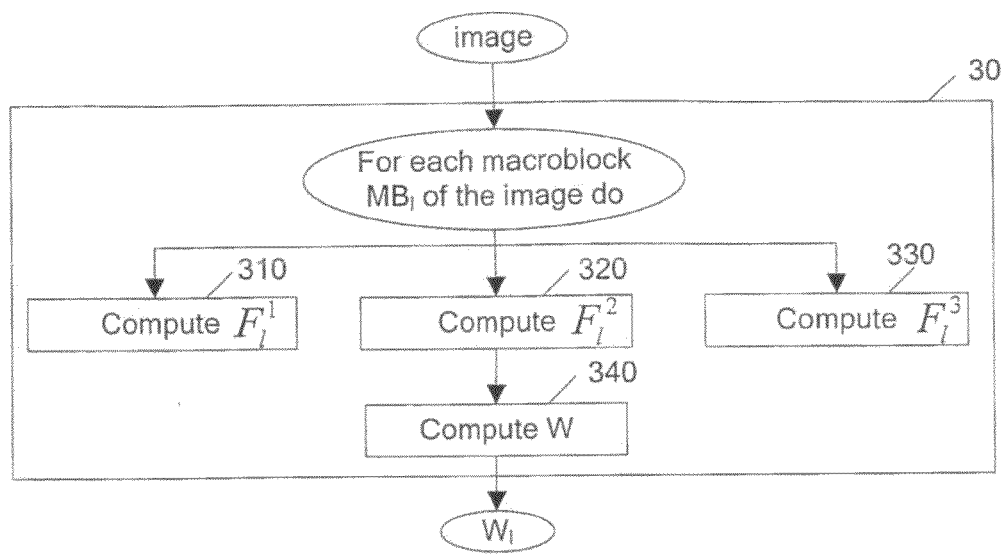
FIG. 3 depicts a detailed flowchart of the features extraction step of the method according to a first embodiment of the invention.

A first embodiment of the method is described with reference to FIGS. 1, 2 and 3. The method comprises a step 10 for transforming each block $b_{p,q}$ of the image in a transformed block $B_{p,q}$ of coefficients. If a block $b_{p,q}$ is located in a macroblock $M_l$, then the transformed block $B_{p,q}$ is located in the corresponding transformed macroblock denoted $MB_l$. Each block $b_{p,q}$ is, for example, transformed in a transformed block $B_{p,q}$ by a Discrete Cosine Transform (DCT) according to the following equation:

$$B_{p,q}(u,v) = \frac{4Q(u)Q(v)}{N^2} \sum_{j=0}^{N-1} \sum_{k=0}^{N-1} b_{p,q}(j,k) \cdot \cos\left[\frac{(2j+1)u\pi}{2N}\right] \cdot \cos\left[\frac{(2k+1)v\pi}{2N}\right],$$

where:

$u, v = 0, 1, \ldots, N-1$ $b_{p,q}(j,k)$ is the luminance value (or chrominance value) of the pixel of block $b_{p,q}$ whose coordinates are $(j,k)$;

$B_{p,q}(u,v)$ is the value of the coefficient of transformed block $B_{p,q}$ whose coordinates are $(u,v)$; and $$-Q(w) = \begin{cases} \frac{1}{\sqrt{2}}, & \text{if } w = 0 \\ 1, & \text{if } w = 1, 2, \ldots, N-1 \end{cases}$$

At step 20 each coefficient $B_{p,q}(u,v)$ of each transformed block $B_{p,q}$ is quantized with a quantizing parameter $QP_{p,q}(u,v)$ into a quantized coefficient $B^Q_{p,q}(u,v)$. According to a first aspect of the invention, all DC coefficients in the image are quantized 210 with a same quantizing parameter $QP_f$, i.e. $\forall(p,q)$, $QP_{p,q}(0,0)=QP_f$. This makes it possible to ensure a continuous basic quality on the whole image. This quantizing parameter $QP_f$ is for example determined by a rate control method such as the well known TM5 rate control method described for MPEG2 in the document N0400 from ISO/IEC JTC1/SC29/WG11 entitled "Test Model 5" dated April 1993. According to another aspect of the invention, all the AC coefficients of all the blocks $B_{p,q}$ located in the same macroblock $MB_l$ are quantized 220 with a same quantizing parameter $QP_l$ which may or may not be equal to $QP_f$. According to a specific characteristic, the quantizing parameter used to quantize all these AC coefficients equals $QP_l = QP_f + \Delta QP_l$, where $\Delta QP_l$ is determined on the basis of the perceptual interest of the macroblock $MB_l$. In this case, for all the AC coefficients in $MB_l$, $QP_{p,q}(u,v) = QP_l = QP_f + \Delta QP_l$. According to the first embodiment, $\Delta QP_l = -W_l \cdot QP_{step}$ where $QP_{step}$ set for example to 2. The weight $W_l$ is computed 30 by combining 340 three different features $F_l^1$, $F_l^2$ and $F_l^3$ computed from the macroblock $M_l$ at steps 310, 320 and 330 respectively. The first feature associated to each macroblock $M_l$ in the image takes its value in the set $\{0,1\}$. If $F_{p,q}^1=1$ then the macroblock $M_l$ belongs to a skin region, e.g. a human face otherwise, i.e. $F_l^1=0$, the block does not belong to a skin region. To compute

310 this feature it is required to detect the skin tones. To this aim, the skin region in the image, if any may be detected using a method of color segmentation such as the one proposed by D. Cai and K. N. Ngan in the document entitled "Face segmentation using skin color map in videophone applications" published in IEEE transactions on CSVT in 1999. This feature will make it possible to quantized more finely skin regions which are important to human eyes from a visual quality point of view. The second feature $F_l^2$ associated to each macroblock M, in the image takes its value in the set $\{0,1\}$. If $F_l^2=1$ then the macroblock M, is a flat region otherwise it is not. To this aim, the variance $v_k$ of each block $b_{p,q}$ located in macroblock $M_l$ is used to compute the value act, as follows:

$$act_l = 1 + \min(v_1, v_2, \ldots, v_k)$$

where $v_k$ is the variance of the $k^{th}$ block located in the macroblock $M_l$. If $act_l$ is smaller than a predefined threshold THT, the macroblock $M_l$ is a flat region, i.e. $F_l^2=1$, otherwise $F_l^2=0$. THT can be set to 8 in most applications. This feature makes it possible to quantize more finely the flat regions, ie. low detailed regions. Indeed, visual defects in such flat regions are more annoying for human eyes. The third feature $F_l^3$ associated to each macroblock $M_l$ in the image takes its value in the set $\{0,1\}$. To compute 330 the value $F_l^3$, the average luminance level over the macroblock $M_l$ is compared to two thresholds THL and THH which can be set to 23 and 1952 respectively. A value named level is then derived as follows:

$$level = \begin{cases} 0, & \text{if } 0 \leq luma < THL \\ 1, & \text{if } THL \leq luma \leq THH \\ 2, & \text{if } THH < luma \leq 255 \end{cases}$$

$F_l^3=0$ if level=0 or 2, and $F_l^3=1$ if level=1. This feature makes it possible to quantize more finely mid-tones regions to which human eyes is more sensitive from a visual quality point of view.

The three features are combined 340 as follows in the weight $W_l$:

$$W_l = \begin{cases} 3, & \text{macroblock } M_1 \text{ has 3 features that equal 1} \\ 2, & \text{macroblock } M_1 \text{ has only 2 features that equal 1} \\ 1, & \text{macroblock } M_1 \text{ has only 1 feature that equal 1} \\ -2, & \text{macroblock } M_1 \text{ has no feature that equal 1} \end{cases}$$

Figure 4:
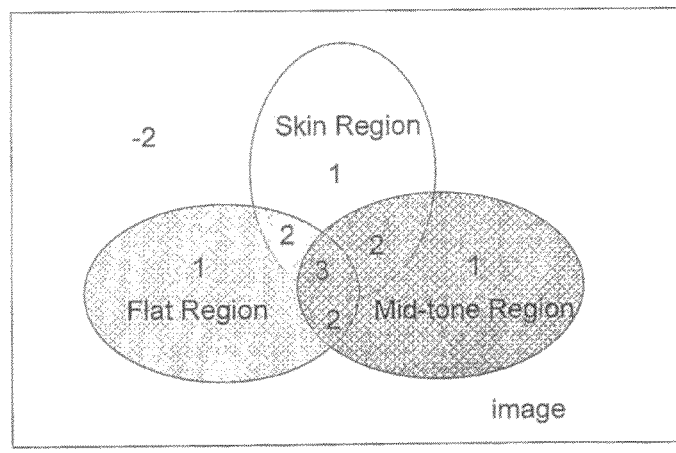
FIG. 4 depicts, for regions within an image, the level of visual perceptual interest of these regions using different grey levels.

This is illustrated by FIG. 4.

The quantized coefficients are then encoded at step 40, for example by a classical entropy coding method such as the one described at section 7.9 in a document from ISO/IEC 14496-10 entitled <<Information technology—Coding of audio-visual objects—Part 10: Advanced Video Coding>>.

Figure 5:
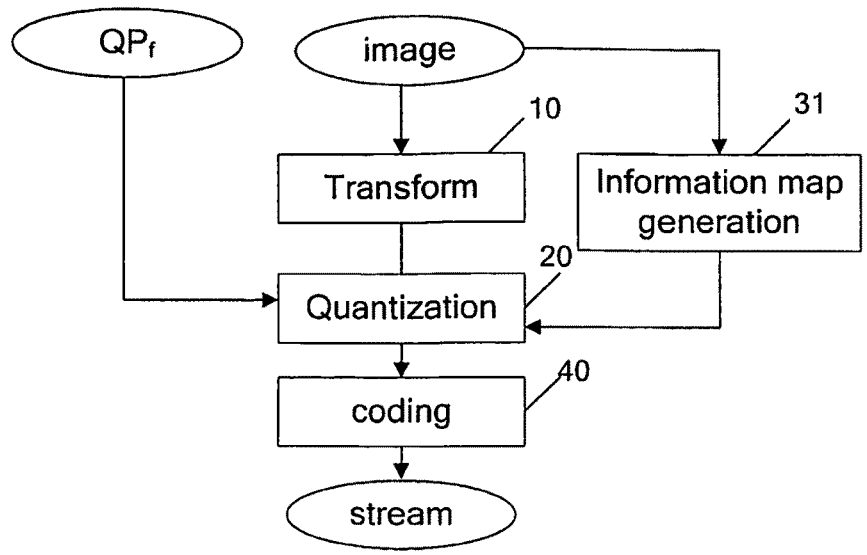
FIG. 5 depicts a flowchart of the method according to a second embodiment of the invention.

A first embodiment of the method is described with reference to FIGS. 2 and 5. The method comprises a step 10 for transforming each block $b_{p,q}$ of the image in a transformed block $B_{p,q}$ of coefficients. If a block $b_{p,q}$ is located in a macroblock $M_l$, then the transformed block $B_{p,q}$ is located in the corresponding transformed macroblock denoted $MB_l$. Each block $b_{p,q}$ is, for example, transformed in a transformed block $B_{p,q}$ by a Discrete Cosine Transform (DCT) according to the following equation:

$$B_{p,q}(u, v) = \frac{4Q(u)Q(v)}{N^2} \sum_{j=0}^{N-1} \sum_{k=0}^{N-1} b_{p,q}(j, k) \cdot \cos\left[\frac{(2j+1)u\pi}{2N}\right] \cdot \cos\left[\frac{(2k+1)v\pi}{2N}\right],$$

where:

u, v=0, 1, ..., N−1

$b_{p,q}(j,k)$ is the luminance value (or chrominance value) of the pixel of block $b_{p,q}$ whose coordinates are (j,k);

$B_{p,q}(u,v)$ is the value of the coefficient of transformed block $B_{p,q}$ whose coordinates are (u,v); and $$-Q(w) = \begin{cases} \frac{1}{\sqrt{2}}, & \text{if } w = 0 \\ 1, & \text{if } w = 1, 2, \ldots, N-1 \end{cases}$$

At step 20 each coefficient $B_{p,q}(u,v)$ of each transformed block $B_{p,q}$ is quantized with a quantizing parameter $QP_{p,q}(u,v)$ in a quantized coefficient $B^Q_{p,q}(u,v)$. According to a first aspect of the invention, all DC coefficients in the image are quantized 210 with a same quantizing parameter $QP_f$, i.e. $\forall(p,q), QP_{p,q}(0,0)=QP_f$. This makes it possible to ensure a continuous basic quality on the whole image. This quantizing parameter $QP_f$ is for example determined by a rate control method such as the well known TM5 rate control method described for MPEG2 in the document N0400 from ISO/IEC JTC1/SC29/WG11 entitled "Test Model 5" dated April 1993. According to another aspect of the invention, all the AC coefficients of all the blocks $B_{p,q}$ located in the same macroblock $MB_I$ are quantized 220 with a same quantizing parameter $QP_I$ which may or may not be equal to $QP_f$. According to a specific characteristic, the quantizing parameter used to quantize all these AC coefficients equals $QP_I=QP_f+\Delta QP_I$, where $\Delta QP_I$ is determined on the basis of the perceptual interest of the macroblock $MB_I$. In this case, for all the AC coefficients in $MB_I$, $QP_{p,q}(u,v)=QP_I=QP_f+\Delta QP_I$. According to the second embodiment, $$\Delta QP_I = \frac{V_I - 128}{128} \cdot QP'_{step},$$

where $V_I$ is the importance level $V_I$ of the macroblock $M_I$. In this case $QP'_{step}$ may be set to 6. $V_I$ is computed at step 31 from the macroblock $M_I$ and is clipped so that it lies in the range [0-255]. To this aim the information map described by N. Bruce in the document entitled "Image analysis through local information measure" published in the Proceeding of the 17$^{th}$ International Conference on Pattern Recognition, pp. 616-619, August 2004 is computed 31 for the whole image. This map assigns an importance level $V_I$ to each macroblock $M_I$. This method makes it possible to identify the perceptually important regions in the image by analyzing the properties of local image statistics in a classic information theoretic setting. Therefore it enables for adjusting the quantization parameter more continuously and thereby improves the visual quality of the decoded image.

The quantized coefficients are then encoded at step 40, for example by a classical entropy coding method such as the one described at section 7.9 in a document from ISO/IEC 14496-10 entitled <<Information technology—Coding of audio-visual objects—Part 10: Advanced Video Coding>>.

This solution makes it possible to get a smoothly distributed perceptual quality improvement with little change on the overall bitrate.

Figure 6:
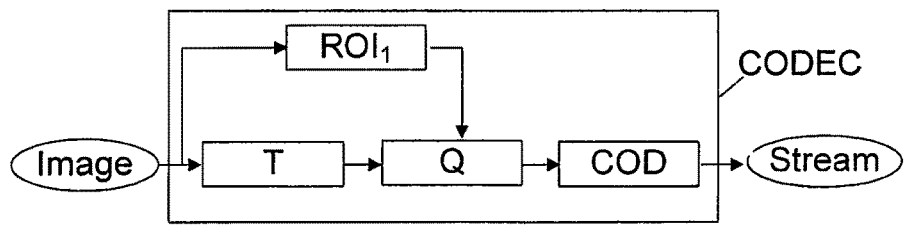
FIG. 6 depicts a coding device according to a first embodiment of the invention.
Figure 7:
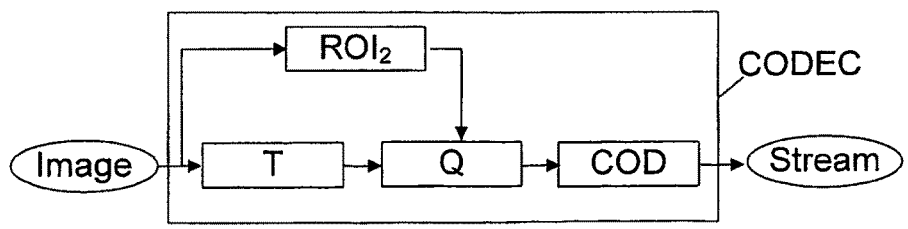
FIG. 7 depicts a coding device according to a second embodiment of the invention.

The invention also relates to a coding device CODEC depicted on FIGS. 6 and 7. On these figures, the similar elements are referenced with the same numbers. The device CODEC comprises a module T for transforming each block $b_{p,q}$ of the image in a transformed block $B_{p,q}$ of coefficients. It implements for example a DCT. The module T is linked to a module Q adapted for quantizing each coefficient $B_{p,q}(u,v)$ of each transformed block $B_{p,q}$ in a quantized coefficient $B^Q_{p,q}(u,v)$. The module Q implements the step 20 of method described above. Therefore, the device CODEC comprises a module $ROI_1$ linked to the module Q and adapted to compute a weight $W_I$ for each macroblock $M_I$ of the image for example by implementing the steps 310 to 340 of the method described above. According to another characteristic depicted on FIG. 7, the module $ROI_1$ in the device CODEC is replaced by a module $ROI_2$ adapted to compute an importance level $V_I$ for each macroblock $M_I$ of the image for example by implementing the method described in the document entitled "Image analysis through local information measure" published in the Proceeding of the 17$^{th}$ International Conference on Pattern Recognition, pp. 616-619, August 2004. The module Q is further linked to a module COD adapted for encoding the quantized coefficients $B^Q_{p,q}(u,v)$. It is preferentially an entropy coder.

The invention described for an image may be advantageously applied to a video, more precisely to each image of the video.

The invention claimed is:

1. Method of encoding an image divided into non-overlapping macroblocks themselves divided into non-overlapping blocks of N by N pixels into a binary stream comprising the steps of:
    transforming each of said block into a transformed block of coefficients comprising one low frequency coefficient and $N^2$-1 coefficients, called high frequency coefficients, of higher frequencies than said low frequency;
    quantizing each coefficient of each of said transformed blocks with a quantizing parameter;
    encoding said quantized coefficients into a binary stream;
        wherein the low frequency coefficients of said transformed blocks are quantized with a same first quantizing parameter and the high frequency coefficients of a same macroblock are quantized with a same second quantizing parameter wherein said second quantizing parameter is computed as the sum of said first quantizing parameter and of an increment, wherein said increment depends on whether the macroblock belongs to a skin region, to a flat region and further depends on a level of average luminance of said macroblock.

2. Device for encoding an image divided into non-overlapping macroblocks themselves divided into non-overlapping blocks of N by N pixels into a binary stream comprising:
    transform means for transforming each of said block into a transformed block of coefficients comprising one low frequency coefficient and $N^2$-1 coefficients, called high frequency coefficients, of higher frequencies than said low frequency;
    quantizing means for quantizing each coefficient of each of said transformed blocks with a quantizing parameter;
    encoding means for encoding said quantized coefficients into a binary stream;
        wherein said quantizing means quantize the low frequency coefficients of said transformed blocks with a same quantizing parameter and the high frequency coefficients of a same macroblock are quantized with a same second quantizing parameter wherein said second quantizing parameter is computer as the sum of said first quantizing parameter and of an increment, wherein said increment depends on whether the macroblock belongs to a skin region, to a flat region and further depends on a level of average luminance of said macroblock.

3. Device according to claim 2, wherein said transform means are a DCT transform unit.

4. Method according to claim 1, wherein said macroblock being divided into k blocks is flat when $1+\min(v1, v2, \ldots, vk)$ is smaller than a first threshold value, where vk is a variance of the $k^{th}$ block of said macroblock.

5. Method according to claim 4, wherein said level of average luminance of said macroblock equals 0 when average luminance of said macroblock is between zero and a second threshold value, equals 1 when average luminance of said macroblock is between said second threshold value and a third threshold value and equals 2 when average luminance of said macroblock is between said third threshold value and 255.

6. Method according to claim 5, wherein said increment equals $(-W_I \cdot QP_{step})$, where $QP_{step}$ is a quantizing parameter and where $W_I$ equals 3 when the three following conditions are true: the macroblock belongs to a skin region, to a flat region and said level of average luminance equals 1;

$W_I$ equals 2 when only two of said conditions are true;
$W_I$ equals 1 when only one of said conditions is true;
$W_I$ equals −2 when none of the conditions is true.

7. Method according to claim 6, wherein $QP_{step}=2$.

8. Device according to claim 2, wherein said macroblock is flat when $1+\min(v1, v2, \ldots, vk)$ is smaller than a first threshold value, where, the macroblock being divided into k blocks, vk is a variance of the $k^{th}$ block of said macroblock.

9. Device according to claim 8, wherein said level of average luminance of said macroblock equals 0 when said average luminance of said macroblock is between zero and a second threshold value, equals 1 when said average luminance of said macroblock is between said second threshold value and a third threshold value and equals 2 when said average luminance of said macroblock is between said third threshold value and 255.

10. Device according to claim 9, wherein said increment equals $(-W_I \cdot QP_{step})$, where $QP_{step}$ is a quantizing parameter and where $W_I$ equals 3 when the three following conditions are true: the macroblock belongs to a skin region, to a flat region and said level of average luminance equals 1;

$W_I$ equals 2 when only two of said conditions are true;
$W_I$ equals 1 when only one of said conditions is true;
$W_I$ equals −2 when none of the conditions is true.

11. Device according to claim 10, wherein $QP_{step}=2$.

* * * * *